(12) United States Patent  (10) Patent No.: US 8,374,905 B2
Graham et al.  (45) Date of Patent: *Feb. 12, 2013

(54) PREDICTING SUCCESS OF A PROPOSED PROJECT

(75) Inventors: Jimmie C. Graham, Mobile, AL (US);
Krishna C. Ratakonda, Yorktown Heights, NY (US); Rose M. Williams, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,654

(22) Filed: Jul. 23, 2012

(65) Prior Publication Data

US 2012/0290359 A1 Nov. 15, 2012

Related U.S. Application Data

(63) Continuation of application No. 12/883,617, filed on Sep. 16, 2010.

(51) Int. Cl.
*G06Q 10/00* (2012.01)
*G06Q 30/00* (2012.01)
(52) U.S. Cl. ..................................... 705/7.32
(58) Field of Classification Search ............... 705/7.32
See application file for complete search history.

(56) References Cited

U.S. PATENT DOCUMENTS

| | | | | |
|---|---|---|---|---|
| 5,798,950 A * | 8/1998 | Fitzgerald | | 703/17 |
| 5,822,207 A * | 10/1998 | Hazama et al. | | 700/97 |
| 5,828,575 A * | 10/1998 | Sakai | | 700/182 |
| 6,865,581 B1 * | 3/2005 | Cloninger et al. | | 705/7.42 |
| 6,889,196 B1 * | 5/2005 | Clark | | 705/7.12 |
| 7,062,449 B1 * | 6/2006 | Clark | | 705/7.15 |
| 7,092,895 B2 * | 8/2006 | Chappel et al. | | 705/7.38 |
| 7,233,908 B1 | 6/2007 | Nelson | | |
| 7,313,531 B2 | 12/2007 | Chappel et al. | | |
| 7,318,039 B2 * | 1/2008 | Yokota et al. | | 705/7.17 |
| 7,359,865 B1 | 4/2008 | Connor et al. | | |
| 7,366,680 B1 * | 4/2008 | Creel et al. | | 705/7.17 |
| 7,487,115 B2 * | 2/2009 | Clark | | 705/7.23 |
| 7,664,670 B1 | 2/2010 | Weiss | | |
| 7,966,220 B2 * | 6/2011 | Clark | | 705/7.14 |
| 2002/0107823 A1 | 8/2002 | Lefebvre et al. | | |
| 2003/0023470 A1 * | 1/2003 | Labbi | | 705/7 |
| 2003/0074291 A1 * | 4/2003 | Hartung et al. | | 705/35 |
| 2003/0093310 A1 * | 5/2003 | Macrae | | 705/8 |
| 2003/0225748 A1 * | 12/2003 | Haeberle | | 707/3 |
| 2004/0148209 A1 * | 7/2004 | Church et al. | | 705/7 |
| 2004/0148245 A1 * | 7/2004 | Chen et al. | | 705/37 |
| 2005/0203786 A1 | 9/2005 | Jessup et al. | | |
| 2005/0283751 A1 | 12/2005 | Bassin et al. | | |
| 2006/0136328 A1 * | 6/2006 | Angermeier | | 705/38 |

(Continued)

OTHER PUBLICATIONS

IBM, "Initial Delivery Index" IP.Com No. IPCOM000183631D, May 29, 2009, pp. 1-3.

(Continued)

*Primary Examiner* — Peter Choi
(74) *Attorney, Agent, or Firm* — John R. Pivnichny; Law Office of Jim Boice (57) ABSTRACT

A computer implemented method, system, and/or computer program product predicts a success of a currently proposed project. Responsive answers to a survey questionnaire for a currently proposed project are received and used to create a predicted success score for the currently proposed project, based on a pattern of responsive answers to a predetermined combination of questions from the survey questionnaire. The predicted success score for the currently proposed project is compared with and matched to actual success scores from prior projects. If the percentage of prior projects that retained their success scores through completion exceeds a predetermined accuracy threshold, then the currently proposed project is approved for implementation.

20 Claims, 4 Drawing Sheets

U.S. PATENT DOCUMENTS

| | | |
|---|---|---|
| 2006/0173762 A1 | 8/2006 | Clater |
| 2006/0259336 A1 | 11/2006 | Anas et al. |
| 2007/0124186 A1* | 5/2007 | Virine .................................. 705/8 |
| 2008/0133259 A1 | 6/2008 | O'Connor et al. |
| 2008/0235151 A1 | 9/2008 | Subramanian |
| 2008/0270197 A1 | 10/2008 | Rafter et al. |
| 2008/0294504 A1 | 11/2008 | Mortensen et al. |
| 2009/0070188 A1 | 3/2009 | Scott et al. |
| 2009/0132322 A1* | 5/2009 | Clark .................................. 705/8 |
| 2009/0138306 A1 | 5/2009 | Coburn et al. |
| 2009/0216602 A1* | 8/2009 | Henderson .......................... 705/9 |
| 2009/0216628 A1* | 8/2009 | Pandey et al. .................... 705/11 |
| 2009/0265200 A1 | 10/2009 | Boswell et al. |
| 2010/0030614 A1 | 2/2010 | Wotzel et al. |
| 2010/0138361 A1* | 6/2010 | Greer et al. .................. 705/36 R |
| 2010/0241891 A1* | 9/2010 | Beasley ............................. 714/1 |
| 2011/0071875 A1* | 3/2011 | Stenhaug et al. ............. 705/7.36 |

OTHER PUBLICATIONS

Procaccino et al., "Case Study: Factors for Early Prediction of Software Development Success", Information and Software Technology, vol. 44, Issue 1, Jan. 15, 2002, pp. 53-62.

J. L. Ward, "Recognizing Project Warning Signs", ESI Horizons Newsletter, Dec. 2003, ESI International, pp. 1-4, http://www.esi-intl.com/public/publications/122003executivewarningsigns.asp.

J. L. Ward, "Recognizing Project Warning Signs, Part 2", Project Manager Today, vol. 16, No. 4, pp. 25-28, http://esi-intl.com/public/publications/022004executivewarningsigns_part2.asp.

J. M. Smith, "Troubled IT Projects Prevention and Turnaround", IEE, London, UK, 2001, Abstract (1 page).

R. Shah et al., "Factors Influencing Partner Selection in Strategic Alliances: The Moderating Role of Alliance Context", May 1, 2008, Strategic Management Journal, vol. 29, pp. 471-494.

A. Hwang, "Yours, Mine, Ours: The Role of Joint Personal Projects in Close Relationships," May 2004, Harvard University, pp. 1-83.

B. Hardgrave, "A Contingency Model for Selecting an Information System Prototyping Strategy," Jul. 1993, Oklahoma State University, pp. i-238.

U.S. Appl. No. 12/883,617, Notice of Allowance Mailed Jun. 21, 2012.

* cited by examiner

PREDICTING SUCCESS OF A PROPOSED PROJECT

The present application is a continuation of U.S. patent application Ser. No. 12/883,617, filed on Sep. 16, 2010, and titled, "Predicting Success of a Proposed Project," which is incorporated herein by reference.

BACKGROUND

The present disclosure relates to the field of computers, and specifically to the use of computers in project risk management. Still more particularly, the present disclosure relates to the use of computers in predicting a successful outcome of a currently proposed project.

SUMMARY

A computer implemented method, system, and/or computer program product predicts a degree of success of a currently proposed project. Responsive answers to a survey questionnaire for a currently proposed project are received and used to create a predicted success score for the currently proposed project, based on a pattern of responsive answers to a predetermined combination of questions from the survey questionnaire. The predicted success score for the currently proposed project is compared with and matched to actual success scores from prior projects. If the percentage of prior projects that retained their success scores through completion exceeds a predetermined accuracy threshold, then the currently proposed project is approved for implementation.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
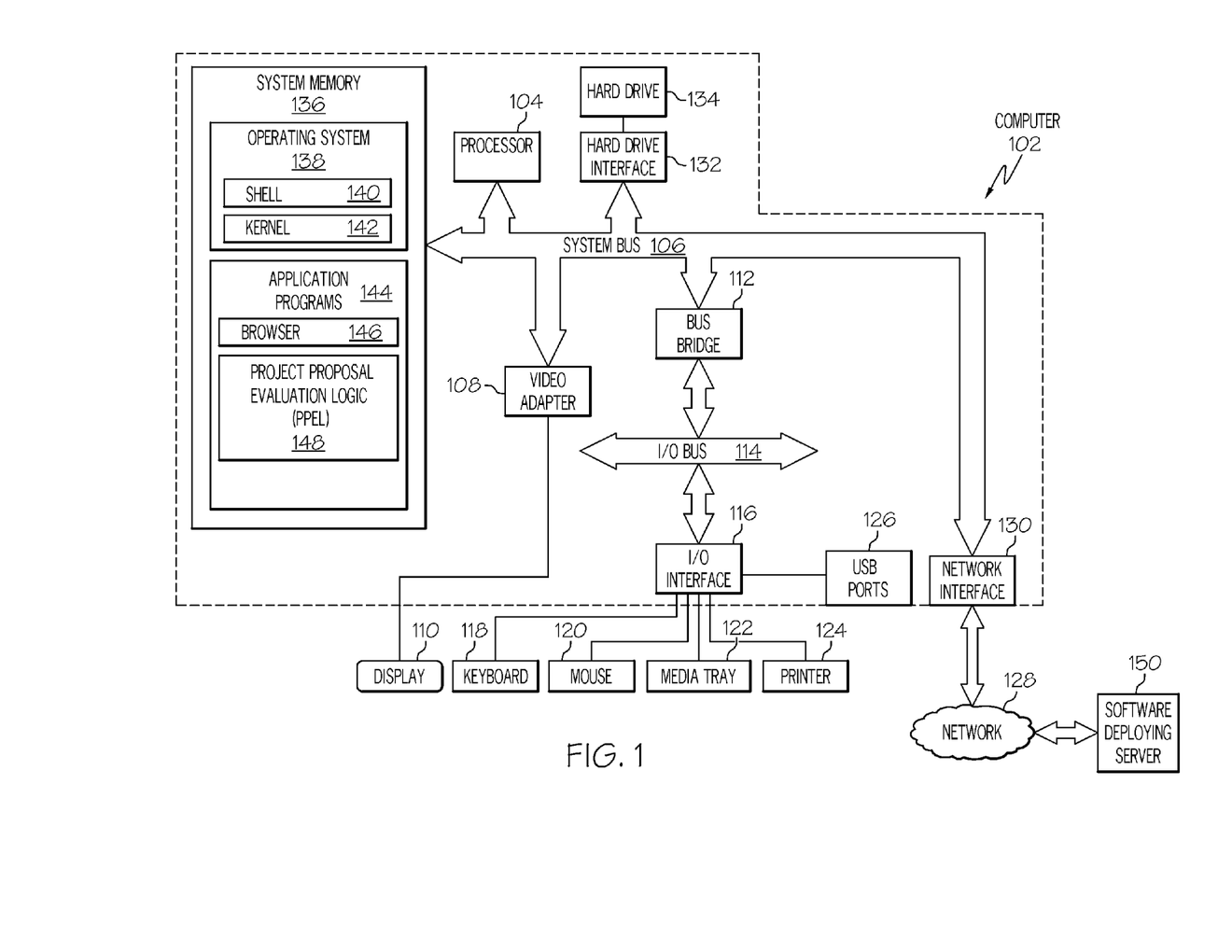
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a project proposal evaluation logic (PPEL) 148. PPEL 148 includes code for implementing the processes described below, including those described in FIGS. 2-5. In one embodiment, computer 102 is able to download PPEL 148 from software deploying server 150, including in an on-demand basis, wherein the code in PPEL 148 is not downloaded until needed for execution to define and/or implement the improved enterprise architecture described herein. Note further that, in one embodiment of the present invention, software deploying server 150 performs all of the functions associated with the present invention (including execution of PPEL 148), thus freeing computer 102 from having to use its own internal computing resources to execute PPEL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
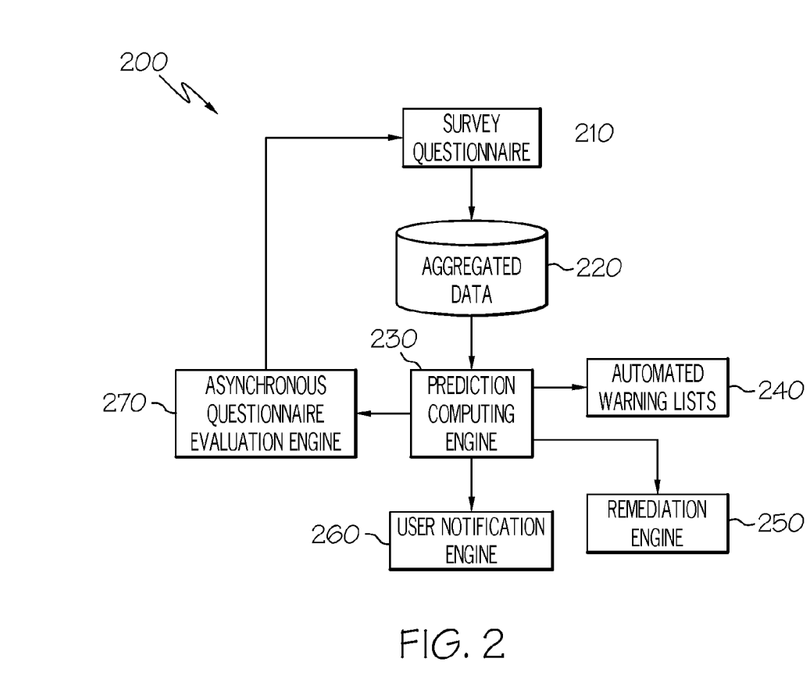
FIG. 2 illustrates an exemplary initial delivery index system that is utilized in at least one process described in the present disclosure.

Referring now to FIG. 2, a system 200 according to one embodiment of the present disclosure is depicted. Note that some or all of the elements depicted in FIG. 2 may be part of PPEL 148 shown in FIG. 1. Element 210 is the user interface of a system depicting a series of subjective and objective questions related to how a contract for a proposed project was created between a vendor and a customer, as described in detail below. Element 220 is the component that aggregates the answers and stores the set in a database. Element 230 then takes the answers, bins them into risk groupings, and invokes a classification algorithm that provides a letter grade and an associated probability of that prediction based on a comparison with previous projects. The prediction results are then stored back into the database. Element 230 also invokes the function of element 240, which in turn generates an automated warning list of projects that are predicted to fail or become troubled. Element 230 also invokes the function of element 250, which in turn generates communication regarding the area(s) of project risk and related remedial actions that need to be taken. Element 260 is the component which interfaces with the user to show the prediction and probability results. Finally, element 270 is a background process that provides a feedback loop. This feedback loop is used to revise the questions or invoke a new analysis.

Figure 3:
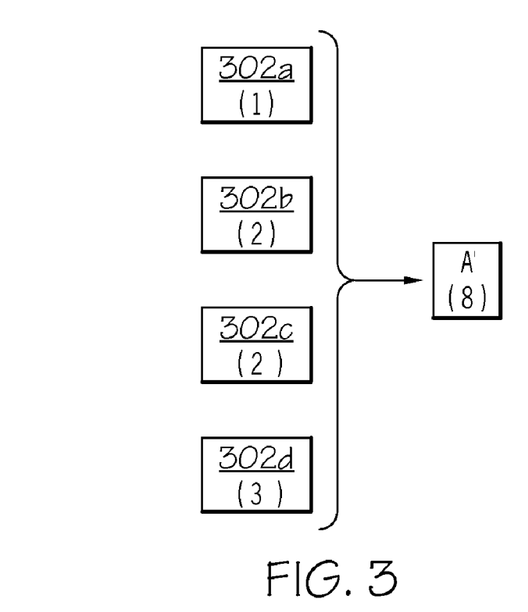
FIG. 3 depicts an exemplary proposed project being scored for success in accordance with weighted answers to multiple pre-project questions.
Figure 4:
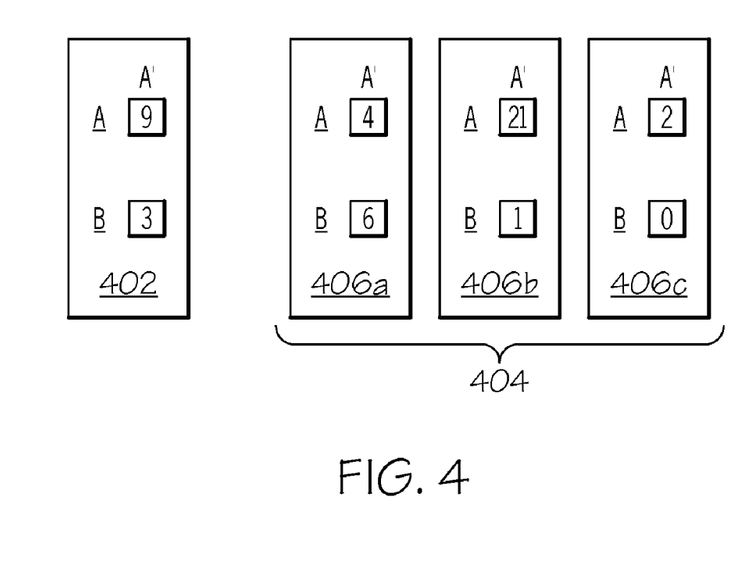
FIG. 4 illustrates the proposed project described in FIG. 3 being compared to similar previous projects and their success scores.
Figure 5:
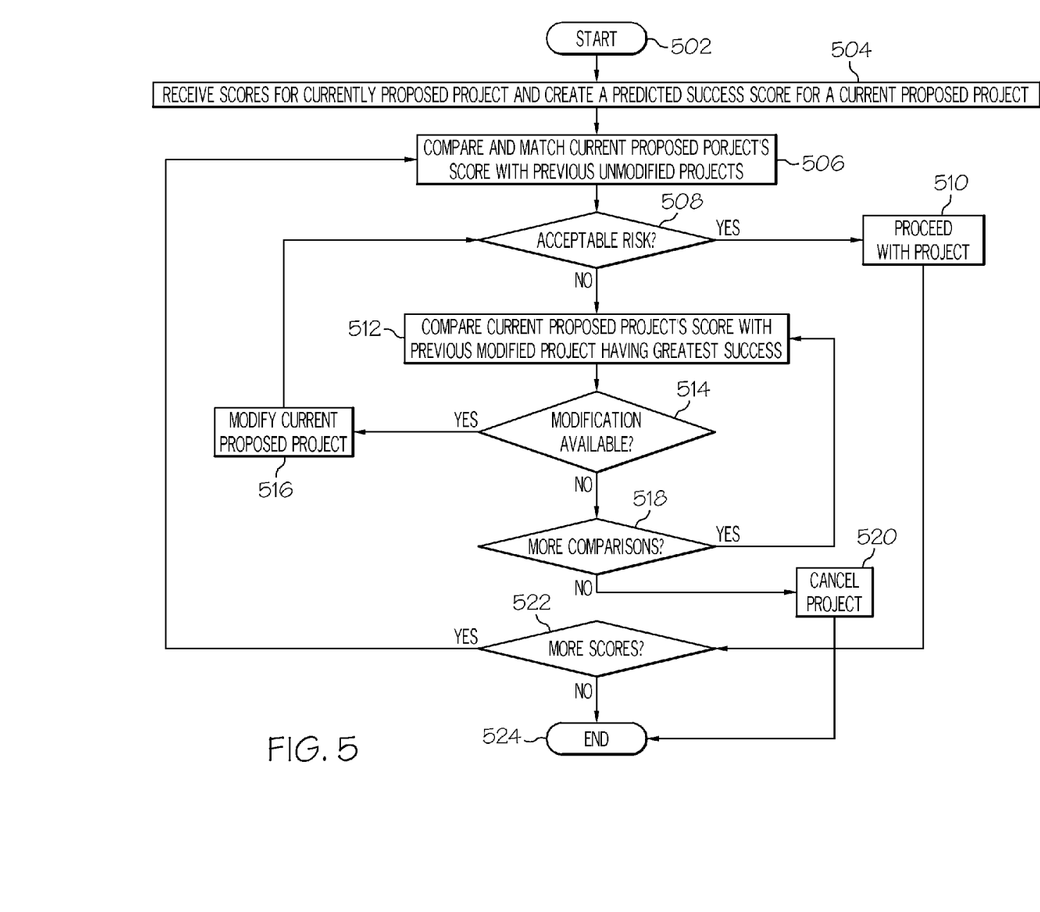
FIG. 5 is a high level flow chart of one or more exemplary steps taken by a processor to predict a success of a currently proposed project.

In order to more fully understand the process described in FIG. 2, including but not limited to elements 230 and 270, reference is now made to FIGS. 3-5. With reference to FIG. 3, assume that vendor representatives that are developing a currently proposed project have answered multiple subjective and objective questions from a questionnaire regarding how the project and its associated contract have been developed. That is, these questions are not related to the actual steps that will be taken to perform the contract/project, but rather are directed to the environment in which the contract/project was created/developed. In one embodiment, assume that there are 10 subjective questions and 6 objective questions in the questionnaire.

For example, consider the following 10 exemplary subjective questions from the questionnaire:

1. Is the client environment friendly or hostile to the vendor? Sub-questions comprise: Based on the vendor's experience with the client (or that of the Proposal Manager) does the customer have a good working relationship with the vendor, have there been past successes/failures, troubled projects/unsuccessful projects, etc.? How easy or difficult is the customer to work with? What is the attitude of the customer toward the vendor? Does the vendor have a history of success with this customer? Is there conflict and infighting in the customer's environment? How well organized is the interlock between information technology (IT) and business management at the customer? Is the customer reasonable and fair with vendors or difficult? Is the customer fully prepared to begin the project? Is the vendor represented on the project steering committee? These questions require subjective answers based on the answerer's experience, business judgment and intuition.

2. Is the contract structure unfavorable to the vendor? For example, do terms of the contract for the currently proposed project provide unequal projection to either the vendor or the customer, thus resulting in undesired "overreaching"?

3. Are the customer's purchasing and legal departments heavily involved in developing the contract? Thus, active involvement with the customer's purchasing and legal departments minimize the potential of future claims of "overreaching" by the vendor.

4. Has the Project Manager successfully managed projects of equal or greater size and complexity? This question is designed to gauge the project manager (PM) competency on the project. Exemplary sub-questions comprise: Is the proposed PM certified as a project manager? Does the proposed PM have experience in successfully managing projects with similar solutions?

5. Did the proposal team seek and incorporate advice from the risk management department of the vendor? If the proposal team fails to utilize the expertise provided by the risk management department, important details regarding how the project will be executed may be overlooked.

6. When will the proposal/contract for the currently proposed project be presented to the customer? For example, is the proposal/contract being submitted at the end of a reporting period, possibly for a department needing additional contracts in order to meet their quota?

7. Is the sales and delivery team of the vendor heavily involved in contract terms or pricing? On occasion, the vendor has larger interests with a customer than just the currently proposed project. For example, if the customer has multiple larger contracts with the vendor that may be impacted by the currently proposed project (i.e., by taking away customer resources from one project in order to meet the requirements of the currently proposed project), this may result in an overall diminishment of the relationship with the customer.

8. Are the skills required to successfully perform the project available: locally, globally, from the customer, or from a vendor (quality, quantity, and timing)? What are the probable issues? Exemplary sub-questions comprise: Does the vendor have enough highly skilled resources available to meet the project plan timeframes? Will the customer meet their personnel obligations? If use of an outside vendor is planned, how available are their resources, how skilled are they, and do they have enough resources to adequately meet the requirements of the currently proposed project?

9. Within what time frame was the proposal baseline assessment (PBA) review required by the vendor's sales team? That is, how much time did the rater from the vendor have to review the deal from receipt of a reviewable draft and support documentation until it was due to the customer?

10. How mature is the proposed solution? Delivery risk is directly related to the amount of unknown elements that might occur on a project. Thus, if similar versions of the currently proposed project have been implemented many times in the past, then there are fewer unknown risks and other "surprises."

Exemplary objective questions include questions 11-16, described below:

11. Is the contract price set by "cost-plus" (Time and Material) or a Fixed Price? If the contract is set at a fixed price, then there is a risk of losing money if the fixed price is set too low. Similarly, if the contract is set at a "cost-plus" rate, in which all costs are passed on to the customer with a predetermined profit markup, then relations with the customer can be damaged if the costs greatly exceed the customer's expectations.

12. What was the number of risk manager (RM) related customer contacts/interactions within the last 12 months? This question focuses on the issue of how many project change requests (PCRs) and project management reviews (PMRs) have been necessitated by problems with other projects for the customer.

13. Of the total number of proposals made to the customer in the last 12 months, what percentage have been signed? This question focuses on the propensity of the customer to favor the current vendor over other competitors. It also provides an indication of the customer's sincerity in asking for a proposal/contract for the currently proposed project.

14. Is there significant competition to the vendor at the customer, in general? While Question 13 provides one means for answering this question, other sources of information include, but are not limited to, a database that describes past contracts/projects between the customer and other competitor vendors, particular knowledge of a risk manager, etc.

15. For the currently proposed project, what was the points difference in estimated profit to the vendor from the initial review to the final submitted bid? Stated another way, this question asks for absolute difference in profit before tax and interest (PTI) points (up or down) from the first to the last iteration of the proposal/contract. For example, if the initial contract was priced at 13% PTI, but the final contract was priced at a 6% PTI, then the difference is 7%. This gives an indication of the proposal team's ability to render a complete and properly priced bid, risk level changes, and of their negotiating strength.

16. How many iterations of this deal did the proposal team/risk manager review? This question an indication of the proposal team's ability to render a complete and properly priced bid and of their negotiating strength. It also measures the customer's preparedness for the project.

Returning now to FIG. 3, assume for exemplary purposes that questions 302*a-d* are a predetermined combination of questions from the sixteen questions just described. Each of the questions from the survey questionnaire have sliding scale answers (e.g., from 1-10), where a lower score indicates a more favorable answer for predicting positive success. For example, if the vendor and customer have a long-standing good working relationship (Subjective Question 1), then the scored answer would likely be between 1-3. However, if the past history between the vendor and the customer has been plagued by poor relationships, then the scored answer would fall between 7-10. The questions 302a-d may be any predetermined combination of subjective or objective questions. Note that, as the exemplary Questions 1-16 discussed above indicate, all of the questions from the survey questionnaire are directed to details about the environment in which a contract between a vendor and a customer for the currently proposed project was created, without regard to specifics as to how the currently proposed project will be performed.

In the example shown in FIG. 3, assume that the answers/responses to questions 302a-d were respectively 1, 2, 2, and 3, for a total of 8, and thus were generally favorable towards predicting success for the currently proposed project. This score of 8 results in a predicted success score of A'. This grade A', based on a pattern of responsive answers (e.g., 1, 2, 2, 3) to a predetermined combination of questions (e.g., 302a, 302b, 302c, 302d) from the survey questionnaire, describes a high likelihood of success for the currently proposed project before project commencement (i.e., before the project is started and/or before the contract for the project is even accepted by the customer). The grade of A' is unique among other "A" rated projects in that 1) it was obtained from the pattern of responsive answers (e.g., 1, 2, 2, 3) to 2) the predetermined combination of questions (e.g., 302a, 302b, 302c, 302d) from the survey questionnaire for 3) projects of a similar nature. At this point, there is a rebuttable presumption that the score A' indicates that the currently proposed project will be successful for the vendor. However, one embodiment of the present disclosure takes this prediction further by comparing this score A' to other similar types of projects that have similar scores. That is, the currently proposed project is compared to similar types of projects that also scored an "A" according to the same pattern of responsive answers (e.g., 1, 2, 2, 3) to the same predetermined combination of questions (e.g., 302a, 302b, 302c, 302d) from the survey questionnaire.

For example, consider FIG. 4, which depicts four sets of prior projects, including prior projects set 402 and prior projects sets 404, which are made of up prior projects sets 406a-c. Prior projects set 402 is made up of 12 prior projects, each of which are similar in scope to the currently proposed project (i.e., the project is for a substantially similar product, having a similar budget, for a similar type of client, etc.). Each of these 12 prior projects was given a success score of "A" based on the same responses to the same questions as the currently proposed project. During the execution of these 12 prior projects, NO changes were made to the projects and how they were implemented. Upon completion, 9 of the 12 prior projects were still rated "A" (indicating high success), but 3 of the 12 prior projects fell to a grade of "B" (indicating low success). As described below, if the vendor is willing to take the risk that there is 25% (3/12) historical chance that the project will not be highly successful, then the project can proceed as planned. However, if this risk is deemed too great, then the vendor can review other similar prior projects that had the same initial success rating as the currently proposed project, but which changed as the project progressed.

That is, consider prior projects set 406a, which is a set made up of 10 prior projects, each of which were initially given a success score of "A" based on the same responses to the same questions as the currently proposed project. During the execution of these 10 prior projects, a first type of change was made to the projects and how they were implemented. For example, assume that data mining reveals that projects from the prior projects set 406a were changed by changing components in the prior project. Upon completion, only 4 of the 10 prior projects were still rated "A" (indicating high success), while 6 of the 10 prior projects fell to a grade of "B" (indicating low success). Thus, there is a high chance (based on past performances) that changing the components of this type of project will have a detrimental effect on the success of the project, and thus should be avoided. However, consider now prior projects set 406b. This set of prior projects was executed by making a second type of change to how the prior projects were performed/executed/implemented. In the example of prior projects set 406b, assume that data mining reveals that projects from the prior projects set 406b were changed by identifying and assigning a new project manager to each of the prior projects in the prior projects set 406b. As shown, 21 out of 22 prior projects in this group were successful, which is far superior to the prior projects set 402 in which no changes were made. Thus, an accurate assumption can be made that changing a project manager to bring in a better fit is highly effective (as shown by prior projects set 406b), while simply changing components (as shown by prior projects set 406a) is not.

Other changes to sets of prior projects include, but are not limited to, adjusting the price of the contract/project, changing vendor teams or individual workers on the project, adjusting a timeline for the project, etc. For example, prior projects set 406c may be defined as a set of projects that were similar to the currently proposed project, but which simply adjusted the price of the contract after commencement. This resulted in all projects (2 of 2) remaining successful throughout the life of the contract. However, since there are only 2 projects in the set, the significance of this change is discounted.

The conclusion drawn from the example of FIG. 4 is that the best way to assure that this particular currently proposed project will be successful is to be ready to insert a better fitting project manager, once such a manager is identified (either before or after the current proposed project initiates).

With reference now to FIG. 5, a high level flow chart of one or more exemplary steps taken by a processor to predict a success of a currently proposed project is presented. After initiator block 502, responsive answers to a survey questionnaire for a currently proposed project are received. The questions from the survey questionnaire are directed to details of how a contract between a vendor and a customer for the currently proposed project was created, without regard to specifics as to how the currently proposed project will be performed. A predicted success score for the currently proposed project is then created based on a pattern of responsive answers to a predetermined combination of questions from the survey questionnaire (block 504). This predicted success score describes a likelihood of success for the currently proposed project before project commencement. Note that in one embodiment, the predetermined combination of questions from the survey questionnaire is a subset (i.e., less than all) of the questions from the survey questionnaire.

As described in block 506, the predicted success score for the currently proposed project is compared to and matched with actual success scores from prior projects. These actual success scores describe/described actual successes of the prior projects after project commencement. As described herein, the actual success scores had a same pattern of responsive answers to the same predetermined combination of questions as the currently proposed project. As shown in exemplary manner above in FIG. 4, an accuracy percentage for actual success scores from the prior projects is then determined. This accuracy percentage describes a percentage of the prior projects that retained one of the actual success scores (i.e., kept a score of "A") until completion (or at least substantial progress in completion) of prior projects (e.g., see elements 402 and 406a-c in FIG. 4).

As described in query block 508, a query is made as to whether the historical risk of proceeding without making any changes to the project is acceptable (see element 402 in FIG. 4). If so, (i.e., in response to determining that the accuracy percentage exceeds a predetermined accuracy threshold), then a message approving the currently proposed project for implementation is transmitted to a project manager (block 510).

Returning to query block 508, in one embodiment the comparison with the prior projects can be overridden by a highly weighted answer to the survey questionnaire. That is, in one embodiment, a question weight is assigned to each question in a survey questionnaire. Thereafter, a threshold value to an answer is assigned to a particularly weighted question, such that an answer to the particularly weighted question that exceeds the threshold value causes logic to override the accuracy percentage in determining whether the currently proposed project is to be implemented. In other words, some questions are so important that they "trump" all other questions. For example, if a response to the survey questionnaire reveals that there is a long history of highly successful prior projects with a particular customer, then the vendor may elect to proceed with the currently proposed project regardless of how the other questions in the survey questionnaire are answered. Similarly, if a response to the survey questionnaire reveals that there is a long history of contentious relations with a customer, then any proposal to present the currently proposed project to the customer may be cancelled, regardless of how the other questions are answered. If the answer to the particularly weighted question exceeds the threshold value in a favorable way (e.g., the vendor and customer have a long standing favorable history), then a message approving the currently proposed project for implementation is transmitted to the project manager, regardless of the accuracy percentage described above.

With reference now to block 512, if the risk of going forward with the currently proposed project without making any changes to the project is deemed too great, then similar sets of prior projects can be evaluated to determine how they were modified (see FIG. 4). In one embodiment, the modification that had the greatest success (e.g., see element 406*b* in FIG. 4) is data searched first to determine how the modification was made. A determination is then made as to whether the modification is feasible (query block 514). That is, the modification may require the services of a project manager having certain qualifications (e.g., certifications, past relationship with the customer and/or teams working on the currently proposed project, etc.), certain software, hardware, and/or services, a budget from the customer that permits raising the price of the contract/project, etc. If the modification is feasible (query block 514), then the currently proposed project is so modified (block 516). If the risk is now acceptable to the vendor (query block 508), then the project proceeds (block 510). However, if the modification is not feasible (query block 514), then the next most beneficial modification is made after comparing the current proposed project with previously modified set of prior projects (blocks 512-516) until there are no more comparisons to be made (query block 518). At that point, a conclusion is drawn that there is no way to modify the currently proposed project in order to make it successful, and the currently proposed project is cancelled/abandoned (block 520).

As described in query block 522, after the currently proposed project commences, or even before the currently proposed project actually commences, the success score of the current project can be recalculated (query block 522) utilizing the above-described steps, including making changes to the project according to the past historical data described above. If there are no more scores to be calculated/recalculated (e.g., the project is completed, or is too far along to be modified), then the process ends (terminator block 524).

As described herein, disclosed is a method and system for predicting the success or failure of a project at the time of project proposal with subsequent automated analyses, during project development, that refine the project health prediction and provide automated alerts for areas of risk in a project. In one embodiment, the system and method also include a feedback loop that is used to refine the survey questions as the development process continues. Thus, if the historical data shows that projects that have been consistently rated as "successful" are actually "unsuccessful," then the value of the questions is questioned, and the questions and/or their value ratings are changed accordingly.

In one embodiment, a project is deemed successful if it is financially profitable to the vendor and/or to the customer. In one embodiment, a project is deemed successful if it enriches the reputation of the vendor and/or the customer. In one embodiment, a project is deemed successful if it leads to future projects between the vendor and the customer. These descriptions of success are representative, and are not to be construed as an exhaustive set of exemplary conditions under which a project is deemed successful or unsuccessful.

In an embodiment of the present disclosure, a set of 16 questions are answered prior to project on-boarding (inception). A classification algorithm is then used to predict the value of the letter grade that will be assigned to the project in the first few project management reviews based on the answers to the question set. Note that for purposes of simplicity, the present disclosure describes only two letter grades: A and B. However, in one embodiment, there are actually four letter grades, ranging from A (certain to be highly successful) to D (certain to be unsuccessful). These letter grades can be consolidated (i.e., consolidating A and B projects and consolidating C and D projects).

In order to have grades that are meaningful, a statistically representative set of historical data from past projects that span a wide variety of geographies, sectors, sizes and contract structures is collected. Although the past projects span the stated wide variety, in one embodiment they are nonetheless related by being directed to a similar type of project/contract.

Note the following features of one embodiment of the present disclosure: (a) The set of questions from the survey questionnaire not only comprise questions that determine complexity or nature of the project, but assess the risks entailed due to the nature of the customer relationship, the ability of the delivery organization to assign resources to the project on a timely basis, contract structure related issues and past history from the dimensions of an industry sector, technology or geography; (b) Objective statistical learning theoretic measures are used to determine a predicted letter grade for the project instead of choosing a simple heuristic, such as averaging the answers to the questions; (c) Each possible grade is assigned a probability by the algorithm, instead of making a single prediction. This helps ensure a measured response that is proportional to the perceived risk; and (d) The questions themselves are calibrated to serve as indicators of trouble-spots (i.e., a higher score elevates the delivery risk—thus they can be used in conjunction with the risk assignment to identify remedial actions for trouble spots).

As described herein, another aspect of the present disclosure is its ability to incorporate real time changes to the system based on the answers to the questions, which can then be used in conjunction with the analysis algorithm to generate an alert when certain parameters, such as gross success, go out of bounds after project inception.

Note further that in one embodiment, the static prediction obtained at project inception can be tweaked in real time to respond to the dynamic project situation by repeating the comparing and matching of the predicted success score for the currently proposed project with actual success scores from prior projects and determining the accuracy percentage for actual success scores from the prior projects after project initiation to derive a new predicted success score. Based on this new predicted success score (which can be derived at any time before completion of the project), terms of the currently proposed project can be modified accordingly.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of predicting a success of a currently proposed project, the computer implemented method comprising:
    a processor receiving responsive answers to a survey questionnaire for a currently proposed project, wherein questions from the survey questionnaire are directed to details of how a contract between a vendor and a customer for the currently proposed project was created, wherein the survey questionnaire comprises a set of subjective questions related to the currently proposed project and a set of objective questions related to the currently proposed project, wherein the set of subjective questions comprises questions that are directed to past interpersonal relationships between the vendor and the customer, a vendor-favorability index of a structure of the contract, a level of involvement with drafting of the contract by the customer, a level of interaction between a proposal team and a risk manager of the vendor in creating the contract, a level of interaction between the proposal team and other enterprise divisions of the vendor, and a quantity of past vendor projects that are substantially similar to the currently proposed project, wherein the set of objective questions comprises questions that are directed to a quantity of customer interactions within a past predefined period on another project, a quantity of proposed projects submitted from the vendor to the customer during the past predefined period, and a difference in success between an initial bid and a final bid by the vendor for the currently proposed project,
    the processor identifying a pattern of responsive answers to a predetermined combination of questions from the survey questionnaire; and
    the processor creating a predicted success score for the currently proposed project based on the pattern of responsive answers to the predetermined combination of questions from the survey questionnaire, wherein the predicted success score describes a likelihood of success for the currently proposed project before project commencement.

2. The computer implemented method of claim 1, further comprising:
    the processor comparing and matching the predicted success score for the currently proposed project with actual success scores from prior projects, wherein the actual success scores describe actual successes of the prior projects after the project commencement, and wherein the actual success scores have a same pattern of responsive answers to the predetermined combination of questions as the currently proposed project;
    the processor determining an accuracy percentage for the actual success scores from the prior projects, wherein the accuracy percentage describes a percentage of the prior projects that retained one of said actual success scores upon completion of prior projects;
    the processor repeating said comparing and matching the predicted success score for the currently proposed project with the actual success scores from the prior projects and said determining the accuracy percentage for actual success scores from the prior projects after the project commencement to derive a new predicted success score; and the processor modifying terms of the currently proposed project in response to the new predicted success score.

3. The computer implemented method of claim 2, further comprising:
the processor assigning a question weight to each question in the survey questionnaire;
the processor assigning a threshold value to an answer to a particularly weighted question, wherein the answer to the particularly weighted question that exceeds the threshold value causes the processor to override the accuracy percentage in determining whether the currently proposed project is to be implemented; and
the processor, in response to detecting the answer to the particularly weighted question that exceeds the threshold value, issuing a message approving the currently proposed project for implementation regardless of the accuracy percentage.

4. The computer implemented method of claim 2, further comprising:
the processor, in response to determining that the accuracy percentage falls below the predetermined accuracy threshold, modifying the currently proposed project.

5. The computer implemented method of claim 1, wherein the predetermined combination of questions from the survey questionnaire is a subset of all questions from the survey questionnaire.

6. The computer implemented method of claim 1, further comprising:
the processor modifying the currently proposed project by identifying and assigning a new project manager to the currently proposed project.

7. The computer implemented method of claim 1, further comprising:
the processor modifying the currently proposed project by adjusting a price of the currently proposed project.

8. The computer implemented method of claim 1, further comprising:
the processor modifying the currently proposed project by changing components of the currently proposed project.

9. A computer program product for predicting a success of a currently proposed project, the computer program product comprising:
a non-transitory computer readable storage medium;
first program instructions to receive responsive answers to a survey questionnaire for a currently proposed project, wherein questions from the survey questionnaire are directed to details of how a contract between a vendor and a customer for the currently proposed project was created, wherein the survey questionnaire comprises a set of subjective questions related to the currently proposed project and a set of objective questions related to the currently proposed project, wherein the set of subjective questions comprises questions that are directed to past interpersonal relationships between the vendor and the customer, a vendor-favorability index of a structure of the contract, a level of involvement with drafting of the contract by the customer, a level of interaction between a proposal team and a risk manager of the vendor in creating the contract, a level of interaction between the proposal team and other enterprise divisions of the vendor, and a quantity of past vendor projects that are substantially similar to the currently proposed project, wherein the set of objective questions comprises questions that are directed to a quantity of customer interactions within a past predefined period on another project, a quantity of proposed projects submitted from the vendor to the customer during the past predefined period, and a difference in success between an initial bid and a final bid by the vendor for the currently proposed project,
second program instructions to identify a pattern of responsive answers to a predetermined combination of questions from the survey questionnaire; and
third program instructions to create a predicted success score for the currently proposed project based on the pattern of responsive answers to the predetermined combination of questions from the survey questionnaire, wherein the predicted success score describes a likelihood of success for the currently proposed project before project commencement; and wherein
the first, second, and third program instructions are stored on the non-transitory computer readable storage medium.

10. The computer program product of claim 9, further comprising:
fourth program instructions to compare and match the predicted success score for the currently proposed project with actual success scores from prior projects, wherein the actual success scores describe actual successes of the prior projects after the project commencement, and wherein the actual success scores have a same pattern of responsive answers to the predetermined combination of questions as the currently proposed project;
fifth program instructions to determine an accuracy percentage for the actual success scores from the prior projects, wherein the accuracy percentage describes a percentage of the prior projects that retained one of said actual success scores upon completion of prior projects;
sixth program instructions to repeat comparing and matching the predicted success score for the currently proposed project with the actual success scores from the prior projects and to redetermine the accuracy percentage for the actual success scores from the prior projects after the project commencement to derive a new predicted success score; and
seventh program instructions to modify terms of the currently proposed project in response to the new predicted success score; and wherein
the fourth, fifth, sixth, and seventh program instructions are stored on the non-transitory computer readable storage medium.

11. The computer program product of claim 10, further comprising:
eighth program instructions to assign a question weight to each question in the survey questionnaire;
ninth program instructions to assign a threshold value to an answer to a particularly weighted question, wherein the answer to the particularly weighted question that exceeds the threshold value causes the processor to override the accuracy percentage in determining whether the currently proposed project is to be implemented; and
tenth program instructions to, in response to detecting the answer to the particularly weighted question that exceeds the threshold value, issue a message approving the currently proposed project for implementation regardless of the accuracy percentage; and wherein
the eighth, ninth, and tenth program instructions are stored on the non-transitory computer readable storage medium.

12. The computer program product of claim 10, further comprising:

eighth program instructions to, in response to determining that the accuracy percentage falls below the predetermined accuracy threshold, modify the currently proposed project; and wherein
the eighth program instructions are stored on the non-transitory computer readable storage medium.

13. The computer program product of claim 9, wherein the predetermined combination of questions from the survey questionnaire is a subset of all questions from the survey questionnaire.

14. The computer program product of claim 9, further comprising:
fourth program instructions to modify the currently proposed project by identifying and assigning a new project manager to the currently proposed project; and wherein
the fourth program instructions are stored on the non-transitory computer readable storage medium.

15. The computer program product of claim 9, further comprising:
fourth program instructions to modify the currently proposed project by changing components of the currently proposed project; and wherein
the fourth program instructions are stored on the non-transitory computer readable storage medium.

16. A computer system comprising:
a central processing unit (CPU), a non-transitory computer readable memory, and a non-transitory computer readable storage medium;
first program instructions to receive responsive answers to a survey questionnaire for a currently proposed project, wherein questions from the survey questionnaire are directed to details of how a contract between a vendor and a customer for the currently proposed project was created, wherein the survey questionnaire comprises a set of subjective questions related to the currently proposed project and a set of objective questions related to the currently proposed project, wherein the set of subjective questions comprises questions that are directed to past interpersonal relationships between the vendor and the customer, a vendor-favorability index of a structure of the contract, a level of involvement with drafting of the contract by the customer, a level of interaction between a proposal team and a risk manager of the vendor in creating the contract, a level of interaction between the proposal team and other enterprise divisions of the vendor, and a quantity of past vendor projects that are substantially similar to the currently proposed project, wherein the set of objective questions comprises questions that are directed to a quantity of customer interactions within a past predefined period on another project, a quantity of proposed projects submitted from the vendor to the customer during the past predefined period, and a difference in success between an initial bid and a final bid by the vendor for the currently proposed project,
second program instructions to identify a pattern of responsive answers to a predetermined combination of questions from the survey questionnaire; and
third program instructions to create a predicted success score for the currently proposed project based on the pattern of responsive answers to the predetermined combination of questions from the survey questionnaire, wherein the predicted success score describes a likelihood of success for the currently proposed project before project commencement; and wherein
the first, second, and third program instructions are stored on the non-transitory computer readable storage medium for execution by the CPU via the non-transitory computer readable memory.

17. The computer system of claim 16, further comprising:
fourth program instructions to compare and match the predicted success score for the currently proposed project with actual success scores from prior projects, wherein the actual success scores describe actual successes of the prior projects after the project commencement, and wherein the actual success scores have a same pattern of responsive answers to the predetermined combination of questions as the currently proposed project;
fifth program instructions to determine an accuracy percentage for the actual success scores from the prior projects, wherein the accuracy percentage describes a percentage of the prior projects that retained one of said actual success scores upon completion of prior projects;
sixth program instructions to repeat comparing and matching the predicted success score for the currently proposed project with the actual success scores from the prior projects and to redetermine the accuracy percentage for the actual success scores from the prior projects after the project commencement to derive a new predicted success score; and
seventh program instructions to modify terms of the currently proposed project in response to the new predicted success score; and wherein
the fourth, fifth, sixth, and seventh program instructions are stored on the non-transitory computer readable storage medium for execution by the CPU via the non-transitory computer readable memory.

18. The computer system of claim 16, wherein the predetermined combination of questions from the survey questionnaire is a subset of all questions from the survey questionnaire.

19. The computer system of claim 16, further comprising:
fourth program instructions to modify the currently proposed project by identifying and assigning a new project manager to the currently proposed project; and wherein
the fourth program instructions are stored on the non-transitory computer readable storage medium for execution by the CPU via the non-transitory computer readable memory.

20. The computer system of claim 16, further comprising:
fourth program instructions to modify the currently proposed project by changing components of the currently proposed project; and wherein
the fourth program instructions are stored on the non-transitory computer readable storage medium for execution by the CPU via the non-transitory computer readable memory.

* * * * *